United States Patent [19]

Biss

[11] Patent Number: 4,493,817

[45] Date of Patent: Jan. 15, 1985

[54] PROCESS FOR RECOVERING PYROCHLORE MINERAL CONTAINING NIOBIUM AND TANTALUM

[75] Inventor: Rudy Biss, Chicoutimi Nord, Canada

[73] Assignees: Teck Corporation, Vancouver; Soquem-Societe Quebecoise d'Exploration Miniere, St. Foy, both of Canada

[21] Appl. No.: 511,253

[22] Filed: Jul. 6, 1983

[51] Int. Cl.[3] .............................................. B01D 11/00

[52] U.S. Cl. ........................................ 423/62; 423/65; 423/68; 75/2

[58] Field of Search .................. 423/62, 68, 65; 75/2, 75/121, 1 R; 209/167

[56] References Cited

U.S. PATENT DOCUMENTS

| | | | |
|---|---|---|---|
| 2,494,283 | 10/1950 | Cassaday et al. | 260/461 |
| 2,725,394 | 11/1955 | Zenftman et al. | 260/461 |
| 2,951,585 | 9/1960 | Burks | 209/167 |
| 2,957,931 | 10/1960 | Hamilton et al. | 260/403 |
| 2,961,457 | 11/1960 | Pohlemann et al. | 260/461 |
| 2,969,378 | 1/1961 | Gleim et al. | 260/396 |
| 2,990,420 | 6/1961 | Gleim et al. | 260/461 |
| 3,014,585 | 12/1961 | Noblitt | 209/167 |
| 3,947,542 | 3/1976 | Charlot | 423/68 |

FOREIGN PATENT DOCUMENTS

| | | | |
|---|---|---|---|
| 892393 | 3/1962 | United Kingdom | 75/2 |

OTHER PUBLICATIONS

Hoechst Aktiengesellschaft "Preliminary Instruction Sheet Collector HOE F 1415 for the Flotation of Non--Sulphide Minerals" Jun. 1981, 6 pages.

Hoechst Aktiengesellschaft "HOE F 2711", 2 pages, 10/77.

*Primary Examiner*—L. Dewayne Rutledge
*Assistant Examiner*—S. Kastler
*Attorney, Agent, or Firm*—Ridout & Maybee

[57] ABSTRACT

Niobium and tantalum containing pyrochlore is recovered from high silicate gangue content ore with good selectivity and yield employing collectors of formula

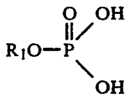

(1)

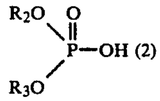

(2)

wherein $R_1$, $R_2$ and $R_3$ are independently 8 to 16 carbon straight or branched chain alkyl groups, at pH 1.5 to 6.5.

13 Claims, 1 Drawing Figure

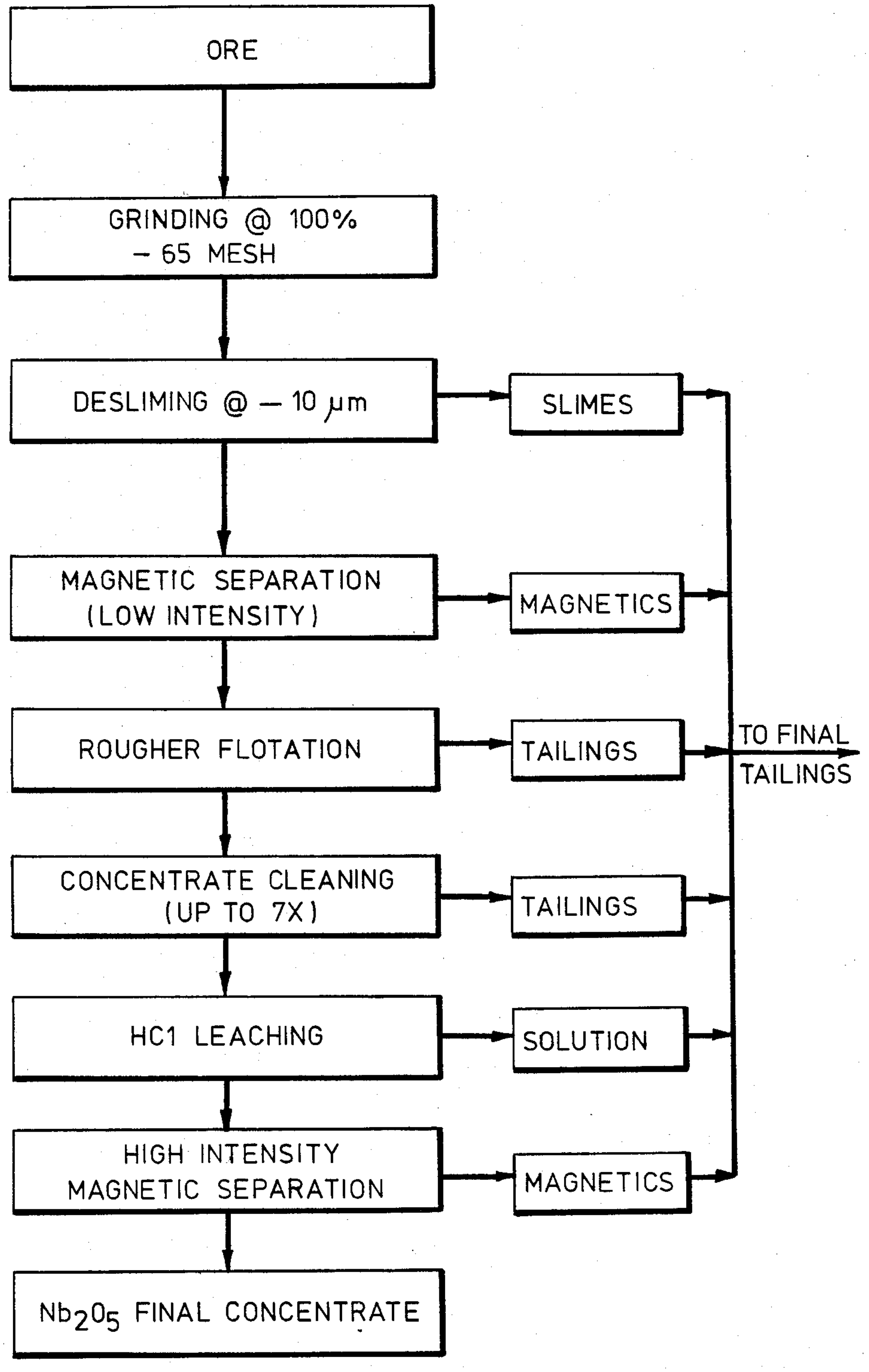
ORE
GRINDING @ 100% − 65 MESH
DESLIMING @ − 10 µm
SLIMES
MAGNETIC SEPARATION (LOW INTENSITY)
MAGNETICS
ROUGHER FLOTATION
TAILINGS
TO FINAL TAILINGS
CONCENTRATE CLEANING (UP TO 7X)
TAILINGS
HC1 LEACHING
SOLUTION
HIGH INTENSITY MAGNETIC SEPARATION
MAGNETICS
Nb2O5 FINAL CONCENTRATE

PROCESS FOR RECOVERING PYROCHLORE MINERAL CONTAINING NIOBIUM AND TANTALUM

Pyrochlore is a valuable mineral which chemically is a complex oxide of sodium, calcium and niobium, having the formula $NaCaNb_2O_6F$. In some forms of the mineral, the element tantalum is present, with the tantalum atoms in intimate association with the atoms constituting the pyrochlore, so that, potentially, recovery of the tantalum is possible along with the pyrochlore mineral. Usually, the pyrochlore mineral containing niobium and tantalum occurs in ores containing substantial quantities of gangue materials. Owing to the economic value of niobium and tantalum metals, it would be highly desirable to provide a process whereby pyrochlore mineral containing niobium and tantalum could be recovered as a relatively niobium and tantalum-enriched concentrate from ores containing the pyrochlore mineral in admixture with substantial quantities of gangue.

The present invention provides a process for recovering a concentrate of pyrochlore mineral containing niobium and tantalum from an ore containing said pyrochlore mineral and gangue materials, said process comprising the steps of: forming an aqueous pulp of the ore in a small particle size suitable for froth flotation; conditioning the pulp by bringing into admixture therewith (a) a collector selected from the group consisting of monofunctional and difunctional phosphoric acid esters of the formula

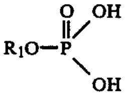 (1) 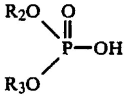 (2)

and admixtures thereof wherein $R_1$, $R_2$, $R_3$ are independently selected from the group consisting of alkyl groups of about 8 to 16 carbon atoms, in an amount sufficient to collect at least a substantial proportion of said pyrochlore present in the pulp, and (b) an acid-reacting compound compatible with said ore, gangue and collector in an amount sufficient to modify the pH of the pulp to a pH in the range about 1.5 to about 6.5; subjecting the conditioned pulp to froth flotation; and recovering a concentrate froth relatively rich in said pyrochlore mineral containing niobium and tantalum.

This process is capable of providing particularly good selective separation of valuable niobium and tantalum-containing pyrochlore mineral from its ores, with good yields of the valuable niobium and tantalum-containing pyrochlore mineral. The above phosphoric acid esters may be monofunctional or difunctional esters of high molecular weight monohydric straight or branched chain alkanols, more preferably of normal, straight chain alkanols, still more preferably having about 10 to 14 carbon atoms in the carbon chain. These materials are readily commercially available, and give good results.

In many deposits, the niobium and tantalum containing pyrochlore mineral is associated with high concentrations of silicate gangue e.g. the ore contains more than about 40% by weight silicate calculated as $SiO_2$. The collectors employed in the present invention are capable of highly selective separation of niobium and tantalum containing pyrochlore mineral from its ores, with good yields, including ores having high silicate contents.

The collectors employed in the present invention are materials that, at ambient temperature, are liquids that are readily dispersible in water, to form stable aqueous solutions or emulsions in concentrations of up to about at least 1%, more preferably of up to about at least 3% by weight, based on the total weight of the solution or emulsion, and thus can be readily dispersed at room temperatures into the aqueous pulp of the finely divided ore material to be treated in the recovery process, without needing to employ auxiliary organic solvents, or the like in order to form a fine dispersion of the collector in the aqueous pulp. One particularly preferred class of the collectors employed in the present invention comprises the materials available under the trade marks HOE F 2711 and HOE F 1415 from Hoechst AG, Frankfort, West Germany. These are mixtures of acidic monoalkyl and dialkyl phosphoric acid esters, comprising a mixture of compounds of the formulae (1) and (2) above and having mixed normal long chain alkyl substitutes $R_1$, $R_2$, and $R_3$, said alkyl groups containing typically about 10 to about 16 carbon atoms, more typically about 12 or 13 carbon atoms in the carbon chain. These HOE F 2711 and HOE F 1415 phosphoric acid ester mixtures are viscous, clear to weakly yellow liquids at normal ambient temperatures, and are dispersible in water in amounts of up to about 5% to form stable aqueous emulsions. At higher concentrations, thickening of the emulsions occurs, and the emulsions become unstable. The HOE F 2711 material is known to be useful as a collector for the flotation of certain non-sulfidic minerals, particularly fluorspar. The HOE F 1415 material is known to be useful as a collector for the froth flotation of metal oxide minerals, of phosphates, and of silicates. The highly selective activity of these collector materials in the froth flotation of oxyfluoride minerals or more specifically of pyrochlore mineral containing tantalum from gangue materials or from ores comprising high proportions of silicates does not, however, appear to have been previously described.

In the process of the present invention, the collectors are employed in relatively small concentrations, typically being added to the aqueous pulp of mineral material and gangue to be treated in a quantity of less than 4% by weight, based on the total weight of solid materials and water present in the aqueous pulp.

As noted above in the preferred collectors of formulae (1) and (2) the groups $R_1$, $R_2$ and $R_3$ are straight chain alkyl groups. Compounds having branched chain alkyl groups $R_1$, $R_2$ and $R_3$, however, have also given good results.

One form of process in accordance with the present invention will now be described in more detail, by way of example only, with reference to the accompanying drawing, which shows a schematic flow sheet of a process in accordance with the invention.

In typical examples of the niobium and tantalum-containing pyrochlore ore to be employed in the process of the present invention, the ore will typically contain about 0.15 to about 0.25% by weight of $Nb_2O_5$ and about 100 to about 300 p.p.m. of $Ta_2O_5$ and thus contains pyrochlore mineral particles containing $Ta_2O_5$ in a weight ratio of $Ta_2O_5$:$Nb_2O_5$ of at least about 0.04:1. Thus, for example, a typical example of a starting material ore would be a nepheline syenite ore from the Province of Quebec, Canada, containing 0.17 to 0.22% by weight $Nb_2O_5$ and 150 to 200 p.p.m. of $Ta_2O_5$. In such typical example, other major elements may be present in about the proportion shown in Table 1.

TABLE 1

| | | | |
|---|---|---|---|
| $SiO_2$: | 55.0% | $TiO_2$: | 0.2 |
| $Al_2O_3$: | 23.4 | $P_2O_5$: | 0.3 |
| CaO | 1.2 | $CO_2$: | 0.7 |
| MgO: | 0.1 | S: | 0.1 |
| $Na_2O$: | 10.4 | Cl: | 0.3 |
| $K_2O$: | 4.5 | Zr: | 200 ppm |
| $Fe_t$: | 1.0 | | |

The typical corresponding mineralogical analysis for the major minerals would be approximately as shown in Table 2:

TABLE 2

| | |
|---|---|
| Albite $NaAlSi_3O_8$ | 44% |
| Microcline $KAlSi_3O_8$ | 19% |
| Nepheline (Na,K) $(Al,Si)_2O_4$ | 32% |
| Biotite $K(Mg,Fe)_3$ $AlSi_3O_{10}(OH)_2$ | 2% |

The minor minerals in such case would be present in amounts indicated in Table 3.

TABLE 3

| | |
|---|---|
| Pyrochlore $NaCaNb_2O_6F$ | 0.3% |
| Apatite $Ca_5(F,Cl)$ $(PO_4)_3$ | 0.6 |
| Calcite $CaCO_3$ | 0.8 |
| Dolomite $CaMg(CO_3)_2$ | 0.3 |
| Ilmenite Fe $TiO_3$ | 0.3 |
| Magnetite $Fe_3O_4$ | a little |
| Pyrite $FeS_2$ | " |
| Pyrrhotite $Fe_{(-1x)}S$ | " |
| Zircon $ZrSiO_4$ | " |

With reference to the drawing, it will be noted that, in the preferred form, the process is a direct flotation process i.e. the pre-treatments, if any, carried out on the ore prior to the first stage of pyrochlore flotation are themselves non-flotative. In some known pyrochlore flotation processes, the ore is subjected to a preliminary gangue flotation, in which the pyrochlore material is depressed and a gangue-rich flotation concentrate is removed. The main pyrochlore flotation recovery process is then conducted on the tailings from this preliminary gangue flotation step. Such processes are, however, somewhat inefficient as greater quantities of pyrochlore flotation agents have to be added to counteract the depressant effects of the conditioning agent added in the preliminary gangue flotation step, which conditioning agent is recovered in the tailings from the gangue flotation step along with the relatively gangue-poor minerals residue. Accordingly, direct pyrochlore flotation processes, in which the pyrochlore flotation is carried out on untreated ore or on ore which has been subjected to non flotative pre-treatments, are greatly preferred.

In the preferred form, as illustrated in the accompanying drawings, the whole ore is first subjected to a conventional particle-size reduction process, e.g. grinding and screening, with recycling of over-sized particles, and with recovery of the particles passing a screen of predetermined mesh dimensions. The extent of the particle size reduction should be sufficient to liberate the particles of pyrochlore mineral from the unwanted gangue materials, and should be sufficient to reduce the material to a particle size such that it can be readily made into a slurry or aqueous pulp appropriate for froth flotation treatment. Typically, as indicated in the accompanying drawing, the grinding and screening operations will be carried out to achieve a fine particle size product with a fineness of 100% −65 mesh. An aqueous pulp thereof is then formed and is subjected to classification by conventional means, and slimes (−10 micron) are rejected.

In many cases, the valuable niobium-tantalum containing pyrochlore is associated with magnetic iron containing impurities or gangue materials, which can be separated out by conventional magnetic separation processing. Desirably the magnetic separation is carried out in two stages. A first magnetic separation step is conducted on the aqueous pulp before commencing pyrochlore flotation processing. However, to avoid excessively high losses of the valuable pyrochlore material along with the separated-out magnetic gangue materials, the primary magnetic separation step is conducted at a relatively low magnetic field intensity. A secondary magnetic separation step is conducted after a valuable pyrochlore mineral-rich concentrate has been produced by flotative processing. The secondary magnetic separation treatment is carried out at a relatively high intensity of the magnetic field in order to separate out magnetic impurities and gangue materials not removed during the pyrochlore flotation steps. The magnetics tailings are discarded.

Following the primary low intensity magnetic separation step, the flotation feed is conditioned with an acid and with the collector. The above-described phosphoric acid ester collectors function to best effect in acid circuit. The nature of the acid employed to regulate the pH of the flotation feed to an acidic pH does not appear to be particularly critical, and any acid-reacting compound that is compatible with the ore, gangue and collector materials and that does not degrade or react with any of these materials to an excessive degree, may be employed. The use of hydrofluoric acid, acid-reacting fluoride compounds, fluosilicic acid, acid-reacting fluosilicate compounds, oxalic acid, or acid-reacting oxalate compounds is, however, particularly preferred, by reason of the particularly good yields of niobium and tantalum-containing pyrochlore materials that are achieved when these acid compounds are employed in combination with the above-described phosphoric acid ester collectors. In some cases, however, particularly if the ore material contains large quantities of carbonate such as calcite and dolomite materials, the use of oxalic and oxalate compounds may not be preferred, as the oxalic acid and oxalates tend to react with the carbonate materials, so that uncontrolled variation in the pH of the acidified pump may occur, and effervescence, due to the carbonate-acid reaction may be a problem. In such cases, the use of another acid such as hydrofluosilicic acid or hydrofluoric acid may be preferred.

Usually the ore material will contain some basic components, which, irrespective of the nature of the acid, will react with the acid and will neutralize it to some extent. Further, the collectors of the present invention are themselves acidic, and tend to react with the basic components present in the ore material if added to the aqueous pulp or flotation feed without preconditioning the feed pulp by additions of acid to it. It is therefore desirable to carry out the conditioning by first dosing the aqueous pulp with the acid and agitating the pulp to disperse the acid throughout the aqueous slurry, and maintaining the mixture for a period of, say, 3 to 5 minutes sufficient for the pH of the mixture to stabilize before the addition of the acidic collector.

Similarly, after the acid-reacting collectors are added, desirably the aqueous pulp is maintained under agitation for a period of say 10 to 15 minutes sufficient to permit the collector to become absorbed on the mineral particles and to permit the pH of the pulp to stabilize.

The mono and difunctional phosphoric acid esters employed in the present invention are sensitive to pH. With progressively decreasing pH i.e. under progressively more acidic conditions, the selectivity of the collectors in promoting the flotation of the valuable niobium and tantalum-containing pyrochlore mineral increases, but at the same time the yields of the mineral decrease. It is therefore desirable to carry out the flotation processing in a number of discrete stages at progressively decreasing pH. The froth concentrate obtained from each stage is recovered and passed to the next stage. There it is reconstituted by addition of water to achieve a solids content and consistency suitable for froth flotation processing. An addition of a further quantity of compatible acid-reacting compound is made in order to achieve a somewhat lower pH and, if necessary, small additions of the collector are made in order to maintain a desired level of selective flotative effect. The conditioned concentrate is then subjected to the next froth flotation, a froth concentrate is received, and is passed to the next stage, and so on.

As noted in the accompanying drawings, following a rougher flotation stage, typically a total of up to about seven concentrate cleaning flotation stages will be performed. The tailings from the rougher flotation stage and from each concentrate cleaning stage are discarded. Typically, in the rougher stage, the upper initial pH will be in the range about 4.3 to about 6.5, more typically about 4 to 6.5, in successive intermediate cleaning stages the pH will be about 3 to 4 and about 2 to 3 respectively, and in the last stage of concentrate cleaning, the pH will have been reduced to about a lower, final pH of 1.5 to 2.5, more typically about 2.0.

In the case in which the ore contains substantial quantities of carbonate and apatite gangue materials, it is desirable to subject the concentrate to leaching with hydrochloric acid after a few cleaning stages or once the flotation is completed. This removes most of the remaining carbonate and apatite from the valuable mineral concentrate. The washings are discarded. Where the leaching is conducted at an intermediate stage of the multiple stage cleaning procedure, it is desirable to employ the hydrochloric acid in dilute form (e.g. about 35%), as the concentrated acid can react with nepheline gangue material producing a gel which can cuase filtration problems. Further, it is desireable to conduct the subsequent cleaner flotation stage at a pH somewhat greater than the pH employed in the cleaner stage immediately preceding the leaching operation. Where the leaching is conducted on the final flotation concentrate, it is preferred to use concentrated hydrochloric acid. At this stage there is little nepheline present.

During the leaching step, the reaction between the leaching acid and the valuable mineral particles in the ore concentrate results in a change in the surface electrical properties of the mineral particles, such that there is a shifting of the zero charge point. Thus the first cleaning stage following leaching needs to be conducted at a pH somewhat greater than that employed in the last cleaning stage immediately preceding the leaching step, in order to avoid excessively high losses of the valuable niobium and tantalum-containing pyrochlore material particles in the trailings from the first cleaning stage following the leaching operation.

Following the final cleaning stage, and the leaching stage, if any, the valuable mineral concentrate is subjected to a high intensity magnetic separation, as discussed in more detail above, and the magnetics fraction is discarded. The relatively magnetics-poor concentrate is recovered as the final product. Although the above description provides ample information for one skilled in the art to carry out a separation process in accordance with the invention, for the avoidance of doubt, an example of one form of the process will now be given.

EXAMPLE

A niobium and tantalum containing pyrochlore ore was ground to 100% −65 mesh, deslimed to remove −10 micron, and subjected to a low intensity magnetic separation. Magnetics were discarded. An aqueous pulp was formed from the residue remaining after the low intensity magnetic separation step. The feed was conditioned first with fluosilicic acid $H_2SiF_6$ and was maintained under agitation for about 3 to 5 minutes to permit the acid to react with basic materials present in the ore. The collector was then added and the mixture was maintained under agitation for about 15 minutes sufficient to permit reaction between the collector and the ore particles present in the pulp to stabilize. The collector employed was HOE F 2711 (trade mark) obtained from Hoechst AG, Frankfurt, West Germany, and consisted of a mixture of monoalkyl and dialkyl phosphoric acid esters of the above formulae (1) and (2), wherein $R_1$, $R_2$ and $R_3$ are mixed alkyl groups containing 10 to 16 carbon atoms in the chain.

During the conditioning step, and prior to conducting the rougher flotation step, the quantity of fluosilicic acid added was approximately 1,210 g/t (i.e. grams per metric ton of the feed, based on the weight of solids present in the feed), and the collector HOE F 2711 was added in an amount of about 308 g/t. The pH of the conditioned pulp thus obtained and employed in the rougher flotation was about 4.5.

The conditioned pulp was subjected to a rougher flotation stage employing conventional flotation processing equipment. The froth concentrate thus obtained was subjected to four further froth flotation cleaning stages, the froth concentrate obtained from each stage being recovered and re-constituted and employed as the feed to the succeeding stage. The pH of the flotation feed to the successive stages, the amounts of acid and of collector, if any, added to the feed prior to the cleaning stage were as follows:

1st cleaning:
- pH=4.0
- acid addition: 620 g/t
- collector addition: 5 g/t

2nd cleaning:
- pH=3.6
- acid addition: 620 g/t
- collector addition: none

3rd cleaning:
- pH=3.2
- acid addition: 868 g/t
- collector addition: none

4th cleaning:
- pH=2.8
- acid addition: 620 g/t
- collector addition: 3 g/t

The froth concentrate obtained from the 4th cleaning stage was subjected to leaching with 35% hydrochloric acid, in an amount sufficient to dissolve out and remove substantially all carbonate and apatite material remaining in the ore concentrate.

Because of the change in the electrical surface properties in the ore particles remaining in the residue after leaching, it was necessary to conduct the next cleaning stage at a somewhat higher pH than that achieved in the 4th cleaning stage, in order to avoid excessive losses of the valuable niobium and tantalum-containing pyrochlore particles.

Following leaching, the leached residue was subjected to three further cleaning stages, under the conditions identified below:

5th cleaning:
- pH=4.5
- acid addition: none
- collector addition: 25 g/t

6th cleaning:
- pH=2.8
- acid addition: 124 g/t
- collector addition: 3 g/t

7th cleaning:
- pH=2.0
- acid addition: 620 g/t
- collector addition: none

Various modifications to the above procedure may be made. For example, the leaching could be carried out once the flotation cleaning stages had been completed, instead of as an intermediate stage during the cleaning flotation stages.

In some cases, it may be desirable to employ conventional gangue depressants such as sodium silicate or causticized starch as an addition to the feed during the cleaning stages, in order to improve the collector selectivity, and reduce the quantity of gangue materials recovered in the froth concentrate.

Tables 4, 5, and 6 indicate the results achieved when carrying out the above-described procedure on three different samples of a niobium-tantalum high silicate content ores, having initial silicate contents (calculated at $SiO_2$) of in excess of about 50%, and containing initial quantities of niobium ranging from about 0.194 up to about 0.218%.

TABLE 4

| | % W | % $Nb_2O_5$ | Distr. $Nb_2O_5$ |
|---|---|---|---|
| Feed: | 100.00 | 0.194 | 100.00 |
| Slimes: | 9.44 | 0.20 | 9.73 |
| Low intensity magnetics: | 0.62 | 0.22 | 0.72 |
| Flotation tailings: | 88.81 | 0.06 | 27.41 |
| Leaching: | 0.61 | — | — |
| High intensity magnetics: | 0.12 | 1.20 | 0.72 |
| Final concentrate: | 0.40 | 29.84 | 61.42 |
| Concentrate Quality: | | | |
| % $Nb_2O_5$: | 29.84 | $Ta_2O_5$: | 4.70 |
| $SiO_2$: | 14.60 | $ZrO_2$: | 12.05 |
| $P_2O_5$: | 0.20 | | |
| $Fe_t$: | 2.80 | | |
| Rougher concentrate | 34.87 | 0.427 | 90.02 |

TABLE 5

| | % W | % $Nb_2O_5$ | Distr. $Nb_2O_5$ |
|---|---|---|---|
| Feed: | 100.00 | 0.213 | 100.00 |
| Slimes: | 11.08 | 0.26 | 13.50 |
| Low intensity magnetics: | 0.77 | 0.03 | 0.09 |
| Flotation tailings: | 86.23 | 0.05 | 20.21 |
| Leaching: | 1.36 | — | — |
| High intensity magnetics: | 0.13 | 1.74 | 1.08 |
| Final concentrate: | 0.43 | 32.30 | 65.12 |
| Concentrate Quality: | | | |
| % $Nb_2O_5$: | 32.30 | $Ta_2O_5$: | 4.70 |
| $SiO_2$: | 11.05 | | |
| $P_2O_5$: | 0.51 | | |
| $Fe_t$: | 3.74 | | |
| $ZrO_2$: | 10.50 | | |
| Rougher concentrate | 40.87 | 0.425 | 92.93 |

TABLE 6

| | % W | % $Nb_2O_5$ | Distr. $Nb_2O_5$ |
|---|---|---|---|
| Feed: | 100.00 | 0.218 | 100.00 |
| Slimes: | 11.08 | 0.26 | 13.22 |
| Low intensity magnetics: | 0.69 | 0.01 | 0.04 |
| Flotation tailings: | 84.77 | 0.05 | 19.46 |
| Leaching: | 2.84 | — | — |
| High intensity magnetics: | 0.10 | 1.47 | 0.69 |
| Final concentrate: | 0.52 | 27.90 | 66.59 |
| Concentrate Quality: | | | |
| % $Nb_2O_5$: | 27.90 | $Ta_2O_5$: | 3.45 |
| $SiO_2$: | 17.09 | $ZrO_2$: | 8.95 |
| $P_2O_5$: | 0.42 | | |
| $Fe_t$: | 3.52 | | |
| Rougher concentrate | 47.19 | 0.372 | 94.68 |

In the procedures of Tables 4, 5 and 6, the weight of the rougher concentrate (% W), given as a percentage of the weight of the feed to the rougher stage, the percent by weight $Nb_2O_5$ in the rougher concentrate, and the % recovery of $Nb_2O_5$, given as a percentage of the $Nb_2O_5$ present in the feed to the rougher stage, were as follows:

I claim:

1. Process for recovering a concentrate of pyrochlore mineral containing niobium and tantalum from an ore containing pyrochlore mineral particles containing $Ta_2O_5$ in a weight ratio of $Ta_2O_5$:$Nb_2O_5$ of at least about 0.04:1 and gangue materials, said process comprising the steps of: forming an aqueous pulp of the ore in a small particle size suitable for froth flotation; conditioning the pulp by bringing into admixture therewith (a) a collector selected from the group of monofunctional and difunctional phosphoric acid esters of the formulae

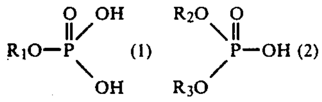
(1) (2)

and mixtures thereof wherein $R_1$, $R_2$, and $R_3$ are independently selected from the group consisting of alkyl groups of about 8 to 16 carbon atoms, in an amount sufficient to collect said pyrochlore present in the pulp to provide a concentrate froth relatively rich in said pyrochlore mineral containing niobium and tantalum, and (b) an acid-reacting compound compatible with said ore, gangue and collector in an amount sufficient to modify the pH of the pulp to a pH in the range about 1.5 to about 6.5; subjecting the conditioned pulp to froth flotation; and recovering a concentrate froth relatively rich in said pyrochlore mineral containing niobium and tantalum.

2. Process as claimed in claim 1 wherein said alkyl groups are of about 10 to 14 carbon atoms.

3. Process as claimed in claim 1 wherein $R_1$, $R_2$, and $R_3$ are each straight chain alkyl groups.

4. Process as claimed in claim 3 wherein said straight chain groups are of about 10 to 14 carbon atoms.

5. Process as claimed in claim 1 wherein the collector is a mixture of said compounds of formulae (1) and (2).

6. Process as claimed in claim 1 wherein the acid-reacting compound is a member selected from the group consisting of hydrofluoric acid, fluoride compounds, fluosilicic acid, fluosilicate compounds, oxalic acid, oxalate compounds, and mixtures thereof.

7. Process as claimed in claim 1 wherein the pH is about 3 to 6.5.

8. Process as claimed in claim 7 wherein the pH is about 4 to 6.5.

9. Process as claimed in claim 8 including the step of cleaning the recovered concentrate froth by forming an aqueous pulp therefrom, adding further quantities of said collector and of said acid-reacting compound to reduce the pH to a pH lower than in the first-mentioned froth flotation stage and in the range about 3 to 4, conducting a second froth flotation and recovering a secondary froth concentrate.

10. Process as claimed in claim 9 including cleaning the secondary froth concentrate in a further flotation stage employing said collector and at pH in the range about 2 to 3, and recovering a tertiary froth concentrate.

11. Process as claimed in claim 1 wherein the ore comprises more than about 40% by weight silicate calculated as $SiO_2$.

12. Process as claimed in claim 1 wherein the ore contains carbonate and apatite impurities and including subjecting the concentrate froth to leaching with hydrochloric acid to substantially free it of carbonate material and reduce the apatite impurity content, and recovering the leached concentrate.

13. Process as claimed in claim 1 wherein the ore contains magnetic iron-containing impurities and including the step of subjecting the ore to a magnetic separation step employing a relatively low intensity magnetic field and withdrawing the separated-out magnetic components before subjecting the ore to said froth flotation, and subsequently subjecting the concentrate froth, before or after said leaching, to a further magnetic separation step employing a relatively high magnetic field, withdrawing the separated-out magnetic components, and recovering the non-magnetic residue remaining from the further magnetic separation step.

* * * * *

UNITED STATES PATENT AND TRADEMARK OFFICE

CERTIFICATE OF CORRECTION

PATENT NO. : 4,493,817

DATED : January 15, 1985

INVENTOR(S) : RUDY BISS

It is certified that error appears in the above-identified patent and that said Letters Patent are hereby corrected as shown below:

Col. 7, line 59, delete.

Col. 8, lines 10 and 26, delete.

Line 34 after "follows" insert

| -- Table 4 | %W | %$Nb_2O_5$ | %Recovery $Nb_2O_5$ |
|---|---|---|---|
| Rougher concentrate | 34.87 | 0.427 | 90.02 |
| Table 5 | | | |
| Rougher concentrate | 40.87 | 0.425 | 92.93 |
| Table 6 | | | |
| Rougher concentrate | 47.19 | 0.372 | 94.68 -- |

Signed and Sealed this

*Fourteenth* Day of *May 1985*

[SEAL]

*Attest:*

DONALD J. QUIGG

*Attesting Officer* *Acting Commissioner of Patents and Trademarks*